United States Patent

Kamiya

[15] 3,687,461

[45] Aug. 29, 1972

[54] THREE DIMENSIONAL SOUND RECORDING AND REPRODUCING SYSTEM

[72] Inventor: Minoru Kamiya, 46-3, 2-chome, Minami-otsuka, Toshima-ku, Tokyo, Japan

[22] Filed: Sept. 10, 1969

[21] Appl. No.: 856,780

[52] U.S. Cl. ....................................274/38, 274/46

[51] Int. Cl. ..........................................G11b 3/44

[58] Field of Search........179/100.41 ST; 274/46, 38, 274/35, 29

[56] References Cited

UNITED STATES PATENTS

| | | | |
|---|---|---|---|
| 2,549,757 | 4/1951 | Corbett | 179/100.41 PE |
| 2,743,110 | 4/1956 | Freiberg | 274/35 X |
| 2,775,460 | 12/1956 | Shivack | 274/38 |
| 3,102,171 | 8/1963 | Laux | 179/100.41 ST |
| 3,401,237 | 9/1968 | Takayanagi | 179/100.1 TD |

FOREIGN PATENTS OR APPLICATIONS

| | | | |
|---|---|---|---|
| 841,294 | 7/1960 | Great Britain | 179/100.41 ST |

*Primary Examiner*—Harry N. Haroian
*Attorney*—Holcombe, Wetherill & Brisebois

[57] ABSTRACT

A three-dimensional sound recording and reproducing system for phonograph records comprises a stylus which vibrates in first and second oscillatory modes transversely of a record groove (as in the Westrex system) and in a third mode longitudinally of said groove.

3 Claims, 10 Drawing Figures

THREE DIMENSIONAL SOUND RECORDING AND REPRODUCING SYSTEM

SUMMARY OF THE INVENTION

This invention relates to a three-dimensional sound recording and reproducing system.

Heretofore, the sound recording and reproducing systems for phonographic records have consisted mainly of the one-dimensional monaural type and the two-dimensional stereophonic type. Recording and reproducing in more than two dimensions was attained by means of a recording tape or film, etc.

The three-dimensional recording and reproducing system according to the present invention comprises three or an integral multiple of three directional microphones or speakers positioned at the three apices of a triangle.

Two inclined surfaces of a groove on the record are used as two components for sound recording and reproducing, as in the stereophonic system, and the variation in displacement of a sound recording and reproducing stylus in the direction of the groove is employed as a third sound recording and reproducing component. These three elements comprise a three-dimensional sound recording and reproducing system.

The details of the invention will be described with reference to the accompanying drawings in which:

FIG. 2(*b*) is a view taken along the line 0 of FIG. 2(*a*), but with only the groove shown in section;

FIG. 2(*c*) is a top plan view of stylus and groove shown in FIG. 2(*a*);

Figure 3:
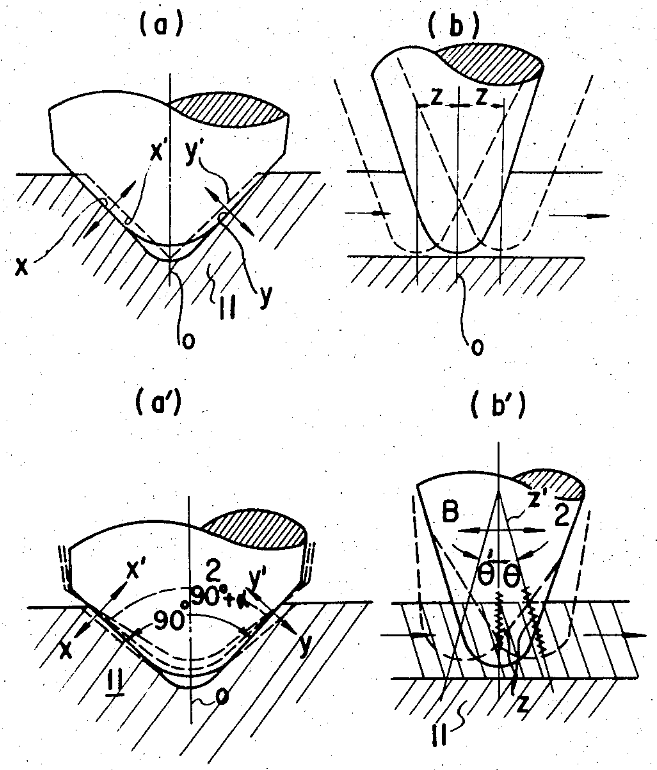
Figure 4:
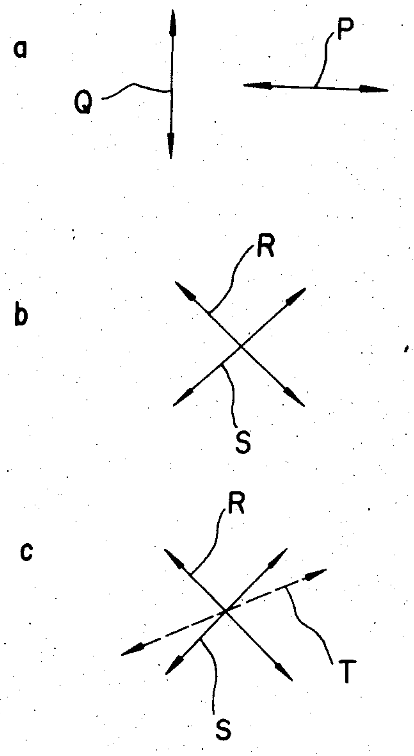
Figure 5:
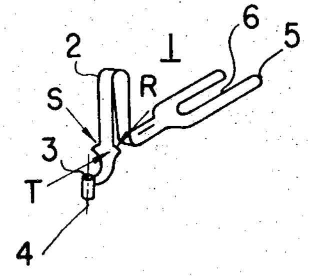
Figure 6:
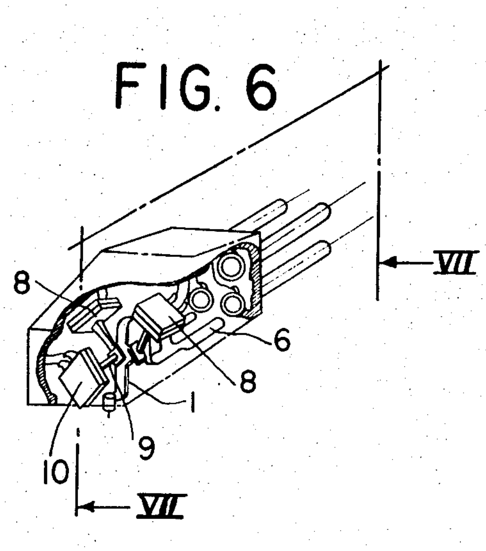
Figure 7:
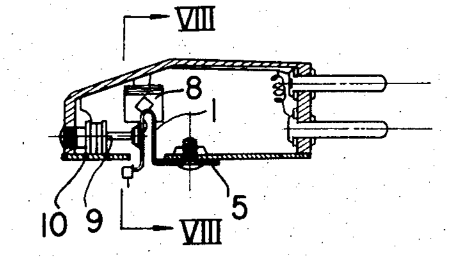
Figure 8:
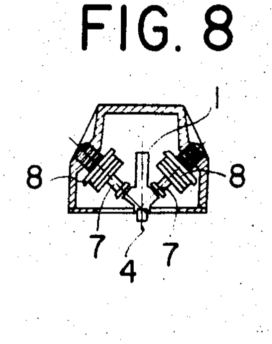
Figure 9:
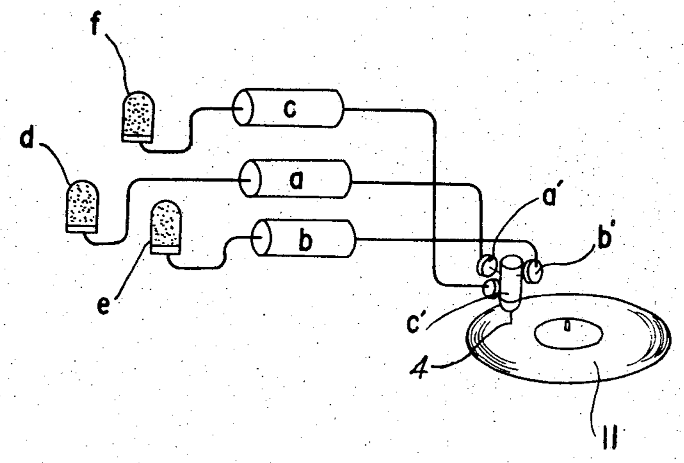
Figure 10:
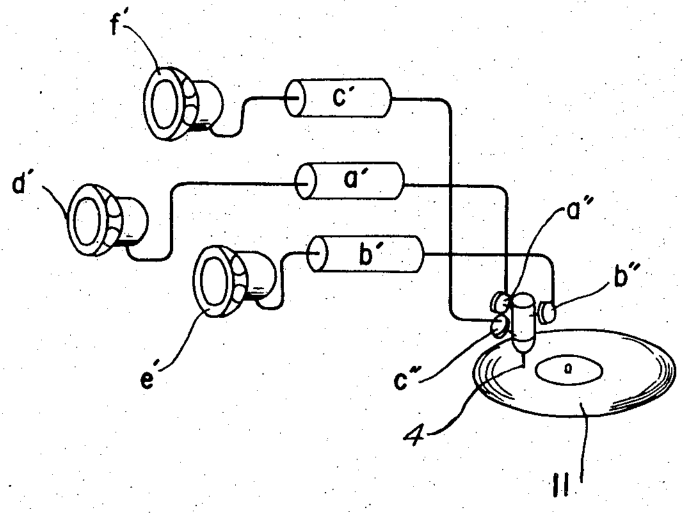

FIGS. 3(*a*) and 3(*b*) are figures similar to 2(*a*) and 2(*b*) designed to illustrate the operation of the invention;

FIGS. 3(*a'*) and 3(*b'*) are views similar to 2(*a*) and 2(*b*) showing yet another embodiment of the invention;

FIG. 4 comprises vector diagrams in which (*a*) and (*b*) are those for a conventional system and (*c*) is a diagram of the system of the invention;

FIG. 5 is a perspective view of a sound reproducing stylus used in the method according to the invention;

FIG. 6 is a fragmentary perspective view of a cartridge provided with a stylus according to FIG. 5;

FIG. 7 is a cross section taken along the line VII—VII of FIG. 6;

FIG. 8 is a cross section taken along the line VIII—VIII of FIG. 7;

FIG. 9 is a system diagram of a sound recording system according to the invention; and FIG. 10 is a second system diagram of a sound reproducing system according to the invention.

Figure 1:
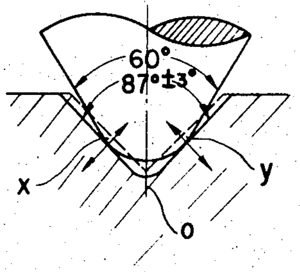
FIG. 1 is an enlarged front view showing a stylus in the groove of a conventional stereophonic system; the slot being shown in section.
Figure 2:
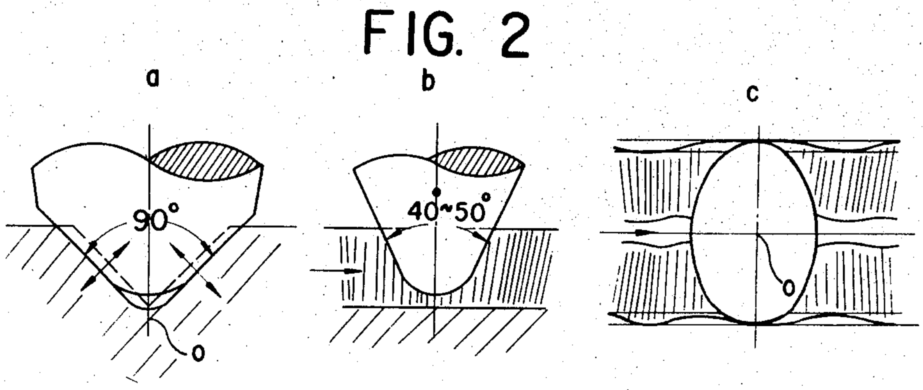
FIG. 2(*a*) is a similar view showing the mechanical relationship between a record groove and a stylus according to the system of the present invention.

Referring now to the drawing, FIG. 1 shows the relationship between a record stylus and the groove of a conventional 45—45 stereophonic system. It is known that two kinds of sound recording and reproducing tracks are recorded and reproduced on the two surfaces (X) and (Y) respectively positioned at an angle of 45° relative to the center line (O) of the record groove. FIGS. 2 and 3 show the relationship between the record stylus and the record groove constituting the essential part of the present invention. In conventional stereophonic records as shown in FIG. 1 a stylus having 90° surfaces at a 90° angle to each other has been used in sound recording while a stylus with walls at a 60° angle to each other is generally used in reproducing. Accordingly the contact surfaces between the record groove and stylus have actually been contact points in most cases. This has various effects on the sound reproduction, and exerts an excessive pressure on the stylus. Moreover, the point contact changes to surface contact in a short period of time, thus significantly reducing the sound effect. The system according to the present invention provides a third sound recording and reproducing oscillatory mode which relies on the variation in displacement of a stylus in the direction of a record groove, that is, the rate of variation of an angle of a stylus, or a variation in the rate of change of the motion of the stylus, parallel with or longitudinally of the recording stylus. Therefore it is preferable that the surfaces (Y), (X) of the record groove and the stylus have a linear contact or multipoint contact. Accordingly the three-dimensional sound recording and reproducing system according to the invention has the advantages of providing greater resistance to wear and longer lasting sound accuracy.

FIG. 2(*b*) is a diagrammatic side view of the invention shown in FIG. 2(*a*). As seen in this figure and also in FIG. 2(*c*), the stylus of the present invention will preferably have an elliptical shape at the tip end thereof for either sound recording or reproducing purposes, because the use of an elliptical stylus, with the longitudinal axis thereof transverse to the direction of advance of the stylus, can greatly increase the frequency range for sound recording and reproducing.

Of course, it is not absolutely essential to use an elliptical-point stylus in all cases. A properly designed circular point stylus may also be used to carry out the present invention, as the effect of the system of the invention may also be dependent on differences in the diameter of the stylus.

FIG. 3 illustrates the operation of the stylus and the record groove, with 3A being a front view which shows two surfaces (X) and (Y) being respectively employed as two tracks for recording and reproducing as seen in a conventional system. Explaining now the third track with reference to the side view of FIG. 3(*b*), it will be noted that the record stylus during the rotation of a record will receive a pressure in the direction of rotation of a record as a consequence of frictional contact with the record groove.

The holder for the stylus may be constructed in such a way that the stylus can change its position, elastically, in the direction of the record slot, with a constant range of oscillation. If thus constructed, the movement of the stylus in the direction of the slot can include an oscillatory component. The operation will be explained first with respect to sound recording. In this case, two kinds of mechanical oscillation may be provided with respect to both surfaces (X) and (Y), which mechanical oscillation is transmitted from two oscillators as in widely known stereophonic systems. According to the present invention, however, the third oscillatory component is provided for example at (Z) in the form of a third mechanical oscillation through an oscillator, as in the above two cases, having an amplitude in the direction of travel of the stylus in the record groove. More plainly, the relative speed of the record and the stylus is almost constant (although the scanning speed of the inner and outer peripheries of a disk record are different). So if a change in angular position is imparted to the stylus in the direction of the groove, a modulated wave will be imparted to the record surface. In this case, the waveforms (X) and (Y), which would be produced in these positions in an ordinary stereophonic system, are made in a leading or lagging position. It is particularly to be noted that the three oscillatory modes (X), (Y), and (Z) must be transmitted in three separate oscillations, crossing at right angles to each other, at the tip end of the stylus, and thereafter recorded on the record surface. If the relationship between the angles of the three oscillations becomes irregular, the three oscillations will interfere with each other and will not be obtained as single components each independent from the other oscillatory modes. If the same kind of oscillatory modes are to be recorded and reproduced three or more oscillatory vectors, crossing at right angles to each other, cannot be obtained in presently known dimensional space. Thus, it is absolutely impossible to both record and reproduce in three dimensions by means of a stylus vibrating in only a single plane.

The opposite is true in the case of reproduction. When a reproducing stylus 2 in contact with the three recording surfaces (X), (Y), and (Z), on which are recorded sounds as described above, slides with a constant speed along a record groove, the transmission of the oscillation of the two recording surfaces (X) and (Y) will be carried out in the same way as in conventional stereophonic systems. In the case of the third sound recording mode (Z) the frictional resistance is periodical in nature, as the stylus 2 travels over the surfaces (X), (Y), while it is recorded as a periodical change in the wave. At the same time, the amplitude is a function of the rate of change of the impression of the waveform on the recording surfaces (X), (Y). The instantaneous vibrational modulation of the frictional resistance is transmitted to the amplifier through transmission means in the cartridge. It is thus possible to obtain the third oscillatory reproducing mode. At this moment, misunderstanding should be avoided. The third oscillatory reproducing mode (Z) is dependent on the wave change in the other modes (X), (Y). As a result it may be thought that the third mode (Z) is only the change in the waveforms (X), (Y), and that accordingly the resultant waveform oscillation cannot be obtained when the stylus scans the waveforms (X), (Y). However, experiments have shown that a periodical amplitude is imparted by the (Z) oscillations to (X), (Y) waveforms and that periodical changes occur in them. In this manner periodical changes in amplitude are imparted to the stylus pressure in the direction of running of the stylus in the groove. And if the reproducing cartridge is constructed just like the sound recording cartridge, the reproducing stylus can operate in the same way as the recording stylus longitudinally of the groove.

The third recording oscillatory mode of the embodiment of FIG. 3($a$)′ and 3($b$)′ will now be described. By rotation of the record the stylus will receive a transverse pressure in a single direction through frictional contact with the record slot. The cartridge may be designed so that it may freely take a posture elastically retaining the inclination ($\theta$), within a constant range with respect to a normal line. It has been found best to maintain the maximum value of ($\theta$), around 15° from the normal line (0). Said angle of inclination ($\theta$) may be provided either on one side ($\theta$) or on both sides ($\theta$), ($\theta'$) of the normal line (0), depending on the structure of the mechanism.

The relationship between the record stylus and the record groove in practice will again be described with reference to FIGS. 3($a$)′ and 3($b$)′. First, in the case of recording, the rotating record 1 is brought into contact with the recording stylus 2. Sounds from three different sources, as described later, are converted to the same number of mechanical oscillations by means of three oscillators operating through an electrical sound system and the variation in the inclination ($\theta$) produced by the right and left recording surfaces (X) and (Y) of the record groove. The vibrations of the third oscillatory mode occur in the plane containing the longitudinal axis of the record groove and the vertical axis of the stylus. For example, if the oscillation of the recording stylus is inclined, in the direction of travel as much as angle ($\theta$), the angle between the walls of the groove formed by surfaces (X) and (Y) would become 90° + a. It is possible, of course, to incline the recording stylus in the beginning, and later shift it to an erect position in dependence on the variation in the oscillation.

In the case of reproduction, the operation is the reverse of the above described operation. As explained, when a reproducing stylus 2 slides longitudinally in the sound groove with a constant speed, the oscillation transmission by the right and left recording surfaces (X), (Y) is performed in the same way as in conventional stereophonic systems. The reproducing stylus 2 is in contact with three sound recording tracks (X), (Y), (Z) already recorded. The third sound recording track (Z) is recorded by utilizing the change in the inclination ($\theta$) of the sound recording surfaces (X), (Y). In the case of reproducing, the stylus 2 reproduces the oscillation, inclining itself according to the inclination ($\theta$). So the third sound recording mode (Z) very seldom interferes with the oscillation of modes (X), (Y). The oscillation of the third sound recording mode (Z) is easily picked out as a quite different recorded sound.

FIG. 4 is a vector diagram showing the direction of vibration of a stylus used in the system according to the present invention and in a conventional one, in which ($a$) is a monaural system using a vertical direction (Q) or a horizontal direction (P). ($b$) is a stereophonic system using two directions (R) and (S) crossing the horizontal at an angle of 45°. ($c$) is a vector diagram of the system according to the present invention which has employed the vector diagram of ($b$) above and a direction of vibration (T) perpendicular to the directions (R) and (S).

FIGS. 5 to 8 show an embodiment of a reproducing stylus and a cartridge containing a stylus suitable for use in the system of the present invention. In this embodiment, the main body 1 of the reproducing stylus is made of a elastic material, and has a U-shaped central part 2. It has a tip 4 made of diamond or sapphire at the end 3 thereof. In its base end 5 is a screw hole 6. Adjacent to the end of the U-shaped part 2 and in a perpendicular portion thereof are connecting members 7 for transmitting oscillation perpendicular to a plane at an angle of 45° to the median plane of the record slot. At the other ends of the connecting members 7, are piezo-electric elements 8, 8. A connecting member 9 is connected at one end to a perpendicular portion of the part 2 and at the other end to a piezo-electric element 10. The piezo-electric elements are respectively connected to three speakers through an amplifier, in a conventional manner.

In such a construction, the stylus tip 4 oscillates right and left relative to the record groove according to the waveform of the record surface (X), (Y).

Thus an oscillation is produced in the direction of the record groove in dependence on the variation in waveform in the direction in which the record groove is advancing and thus the sound is reproduced.

The reproducing device can, of course, include a variety of systems.

Next, in FIG. 9, is shown a sound recording arrangement according to the present invention, which is an illustrative view of a sound recording system in which directive microphones *d*, *e*, *f* are provided in a triangular form directed toward a sound source.

The absorbed sound is transmitted to oscillators *a'*, *b'*, *c'*, in which the electrical oscillation is converted to a mechanical oscillation and three sound tracks are recorded by the sound recording stylus 4 on the surface of the record 11, which rotates at a constant speed.

FIG. 10 is a diagram showing a sound reproducing system, in which, contrary to the above-mentioned arrangement, the reproducing stylus 4 slides along the record groove on the record surface 11. The stylus picks up three kinds of oscillation in contact with the three sound tracks already recorded, and applies these oscillations to the piezo-electric elements *a''*, *b''*, *c''* of the cartridge in which they are converted to electrical waves. The oscillation is then transmitted to the speakers *d'*, *e'*, *f'* through amplifiers *a'*, *b'*, *c'* and converted to sound oscillations so as to reproduce a three dimensional sound recording with high fidelity.

The ideal arrangement of the microphones and speakers used in the sound recording and reproducing is attained by fixing them at each apex of an equilateral triangle. It is also possible to position them at equal intervals on the same line for use as W-type stereophonic microphones when the conditions of use are restricted.

The arrangements of the microphones and speakers for sound recording and reproducing must define similar figures in any case. Otherwise no high-fidelity sound is reproduced.

As explained above, sound recording and reproducing by use of the record according to the present invention, permits complete three dimensional sound recording and reproduction, as compared with conventional stereophonic systems.

What is claimed is:

1. A sound-reproducing stylus for use with a sound record having a V-shaped groove the two sides of which groove lie at right angles to each other and are individually corrugated to define two distinct sound tracks, with the angular positions of the corrugations relative to the plane of the record modified to define a third track, said stylus comprising resilient mounting means capable of flexing in two relatively perpendicular vertical planes, a needle carried by said mounting means to vibrate in response to said sound tracks, when travelling in said groove, in two directions at right angles to each other in one of said planes which is perpendicular to said groove and in one direction through a maximum angle of 15° in the other of said planes, which is tangent to said groove, the tip of said needle having a tapered surface which intersects said one plane along two lines which are at right angles to each other, three transducers for converting vibrations of said needle into an electrical signal, each transducer being connected to convert vibrations in one of said three directions only, and means for transmitting the signal of each transducer, unmodified by any other signal, to sound reproducing means.

2. A stylus as claimed in claim 1 in which said tapered surface intersects a plane perpendicular to the longitudinal axis of said needle along an elliptical line.

3. A sound-reproducing stylus comprising a needle, a thin mounting carrying said needle to vibrate in at least two directions in a single plane and in one direction perpendicular to that plane, said mounting being bent at a right angle and then into a U, with the needle mounted parallel to the U, a separate transducer for converting vibrations in each direction into an electrical signal, and means for transmitting the signal of each transducer, unmodified by any other signal, to sound reproducing means.

* * * * *

UNITED STATES PATENT OFFICE
CERTIFICATE OF CORRECTION

Patent No. 3,687,461 Dated August 29, 1972

Inventor(s) MINORU KAMIYA

It is certified that error appears in the above-identified patent and that said Letters Patent are hereby corrected as shown below:

[30] Foreign Application Priority Data
Sept. 11, 1968 Japan SHO 43-065104

Signed and sealed this 13th day of February 1973.

(SEAL)
Attest:

EDWARD M.FLETCHER,JR.
Attesting Officer

ROBERT GOTTSCHALK
Commissioner of Patents

FORM PO-1050 (10-69)
USCOMM-DC 60376-P69
☆ U.S. GOVERNMENT PRINTING OFFICE : 1969 O—366-334